A. GMEINDER.
HELICAL SPRING FRICTION CLUTCH WITH AUXILIARY CLUTCH.
APPLICATION FILED MAR. 25, 1922.

1,416,283.

Patented May 16, 1922.

Inventor:
Anton Gmeinder
by
Myers, Cavanagh & Whitehead
Attorneys

UNITED STATES PATENT OFFICE.

ANTON GMEINDER, OF MOSBACH, BADEN, GERMANY, ASSIGNOR TO DORTMUNDER VULKAN AKTIENGESELLSCHAFT, OF DORTMUND, GERMANY, A COMPANY OF GERMANY.

HELICAL-SPRING FRICTION CLUTCH WITH AUXILIARY CLUTCH.

1,416,283.  Specification of Letters Patent.  Patented May 16, 1922.

Application filed March 25, 1922. Serial No. 546,765.

*To all whom it may concern:*

Be it known that I, ANTON GMEINDER, engineer, a citizen of Germany, residing at Mosbach, Baden, Germany, have invented certain new and useful Improvements in Helical-Spring Friction Clutches, with Auxiliary Clutches, of which the following is a specification.

This invention relates to helical spring friction clutches with auxiliary clutch, for automobiles, motor locomotives, motor ploughs, and other machines driven at high speed. In throwing the clutch rapidly into action by means of pressure springs or the like it is found to be very difficult to bring the auxiliary clutch slowly and gradually into engagement. The pressure acting on the clutch turns the easily movable element connected to one end of the helical clutch member, very rapidly and in consequence of the inertia the helical spring will very soon exert its frictional action so that there is no proper slipping of the spring and gradual increase of the friction.

In the helical spring friction clutch according to the present invention this disadvantage is avoided by the movable element above mentioned, which is connected to one end of the clutch helix, being constructed as a casing sliding on resilient or expansive rings or other suitable devices. The frictional resistance resulting from the pressure of the elastic rings prevents a sudden rotating of the movable element above mentioned, which may be conveniently identified as a retarding device or element, since the retarding of this element in relation to movement of the other member to which the other end of the helical friction spring is connected causes the clutching action of the helix. The retarding member will, therefore, be gradually checked or retarded, and the main helical clutch spring will be gradually contracted with a corresponding gradual increase of friction of the main clutch.

It is moreover very difficult to supply the frictional surfaces of the helical spring continuously and sufficiently with lubricating material. This will rather be soon dispersed and the clutch will then act by intermittent shocks or will run hot. The present invention renders it possible to supply the oiltight braking disk constructed as a casing with lubricating material so that the friction surfaces are permanently lubricated.

Figure 1:
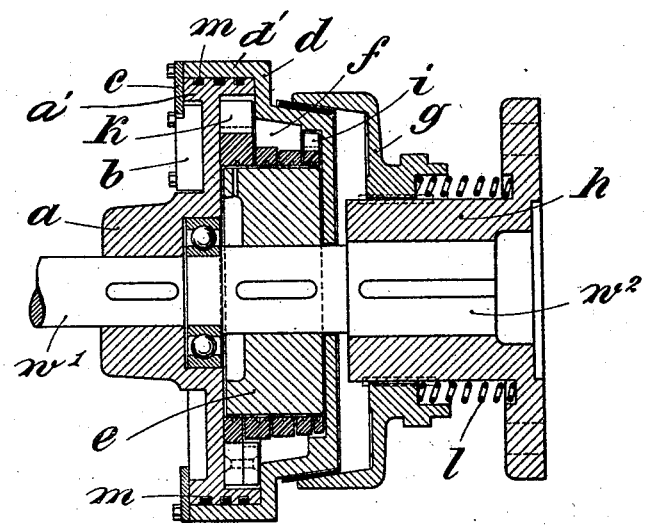
Figure 2:
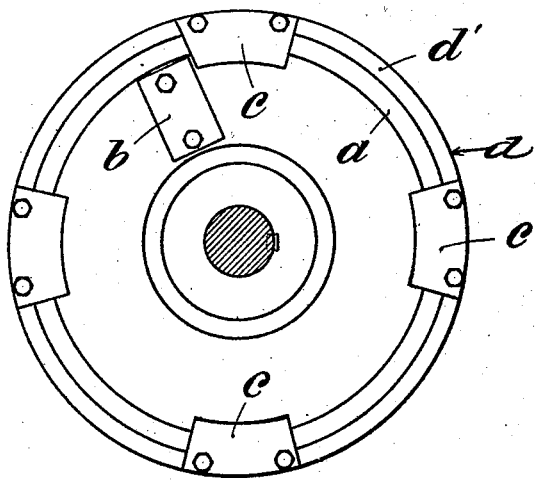

The annexed drawing illustrates by way of example a helical spring friction clutch and shows in Fig. 1 a longitudinal section and in Fig. 2 an end view.

On the shaft $w^1$ is keyed a disk $a$ being in the example shown the driving disk which carries the helical spring $f$ by the head $k$ and in the flange $a'$ of which are provided resilient rings $m$. Instead of an ordinary retarding element or disk there is provided a casing $d$ which contains the helical spring attached to the head $i$ and is secured against axial displacement by stops or plates $c$ secured on the open face of the casing $d$. The drum $e$ is keyed on the shaft $w^2$ which is, in the example shown, the driven shaft. The cone $g$ slides on two tongues on the shaft $w^2$ or on flange $h$ respectively. Springs $l$ exert the pressure necessary for engaging the clutch. The abutment $b$ prevents a coiling off and destruction of the helical spring $f$ on a wrong direction of rotation which is possible, e. g., when the motor is started in a wrong direction. In such case one of the stops or plates $c$ bears against the abutment $b$ and this prevents improper uncoiling of the helical spring $f$.

The casing $d$ is formed with a cylindrical flange $d'$ rotatably fitting the cylindrical surface of the flange $a'$ of the driving disk. The rings $m$ are of any suitable material, such as spring steel, and are located in annular channels in the flange $a'$ of the driving disk and are dimensioned and tensioned so that they expand with spring pressure against the cylindrical flange $d'$ of casing $d$ and act to frictionally retard the rotation of the casing in relation to the driving disk. The rings $m$ at the same time serve as oil retaining rings to retain lubricant within the casing.

The operation of the clutch is as follows: When the shaft $w^1$ drives and the clutch is disengaged the driving disk $a$, the helical spring $f$ and the retarding casing $d$ will rotate. The shaft $w^2$, the sleeve $e$ and the cone $g$ are at rest until the cone is pressed by the springs $l$ against the casing $d$. The friction on the conical surfaces will gradually bring the casing $d$ into rotation and thereby the helical spring $f$ will be pressed upon the drum $e$ until power is transmitted. The frictional action of the rings $m$ prevents the casing $d$ from being too rapidly retarded by the action of the auxiliary clutch $g$, and in this way the application of the main or helical clutch spring is properly retarded with a correspondingly gradual clutching action on the main drum $e$. The clutch can also be operated from the shaft $w^2$ as the driving shaft.

The construction shown is only given by way of example and many modifications may be made in detail within the scope of the invention.

What I claim as my invention and desire to secure by Letters Patent of the United States is:—

1. In a helical spring friction clutch with auxiliary clutch the combination of two shafts, a disk secured on the one shaft and having a cylindrical flange, a drum secured on the other shaft, a helical spring, a slidable cone, a member for contracting the said helical spring and having a cylindrical flange rotatably fitting the disk flange, and oil retaining means between the said cylindrical flanges.

2. In a helical spring friction clutch with auxiliary clutch the combination of two shafts, a disk secured on the one shaft, a drum secured on the other shaft, a helical spring, a slidable cone, a member for contracting the said helical spring with resilient oil-retaining rings inserted between the said member and the said disk.

3. In a helical spring friction clutch with auxiliary clutch the combination of two shafts, a disk secured on the one shaft, a drum secured on the other shaft, a helical spring, a slidable cone, a casing surrounding the said disk and provided with a friction cone with oil-retaining means inserted between the said casing and the said disk.

4. In a helical spring friction clutch with auxiliary clutch the combination of two shafts, a disk secured on the one shaft, a drum secured on the shaft, a helical spring, a slidable cone, a casing surrounding the said disk and provided with a friction cone with resilient oil-retaining rings inserted between the said casing and the said disk.

5. In a helical spring friction clutch with auxiliary clutch the combination of two shafts, a disk secured on the one shaft, a drum secured on the other shaft, a helical spring, a slidable cone, a member for contracting the said helical spring, oil-retaining means inserted between the said member and the said disk with means for supporting the said member against axial movement.

6. In a helical spring friction clutch with auxiliary clutch the combination of two shafts, a disk secured on the one shaft, a drum secured on the other shaft, a helical spring, a slidable cone, a casing surrounding the said disk and provided with a friction cone with oil-retaining means inserted between the said member and the said disk and stops secured on the open face of the said casing for supporting the latter against axial movement.

7. A friction clutch of the class described comprising a driving member, a retarding member rotatably mounted in relation to the driving member, a helical clutch element connected at one end to the driving member and at the other end to the retarding member, a driven member to be engaged by the helical clutch element, means for engaging and retarding the retarding member to apply the helical clutch element, and means for frictionally restraining the movement of the retarding member in relation to the driving member.

8. A fricion clutch comprising a driving member, a disk thereon having a cylindrical flange, a retarding casing having a cylindrical flange rotatively fitting the first-mentioned flange, expansive friction rings intermediate the flanges to retail oil and regulate movement of the retarding casing, and a helical clutch element connected at one end to said disk and at ahe other end to said casing.

In testimony whereof I affix my signature in presence of two witnesses.

ANTON GMEINDER.

Witnesses:
ADOLF BECKMANN,
NOREN W. JENCK.